April 11, 1967   F. E. ERICKSON   3,313,450
VENDING MACHINE FLUID QUANTITY ACCUMULATOR AND DISPENSING TIMER
Filed Feb. 8, 1966   3 Sheets-Sheet 1

INVENTOR.
FREDERICK E. ERICKSON
BY
Meyer, Tilberry & Body
ATTORNEYS

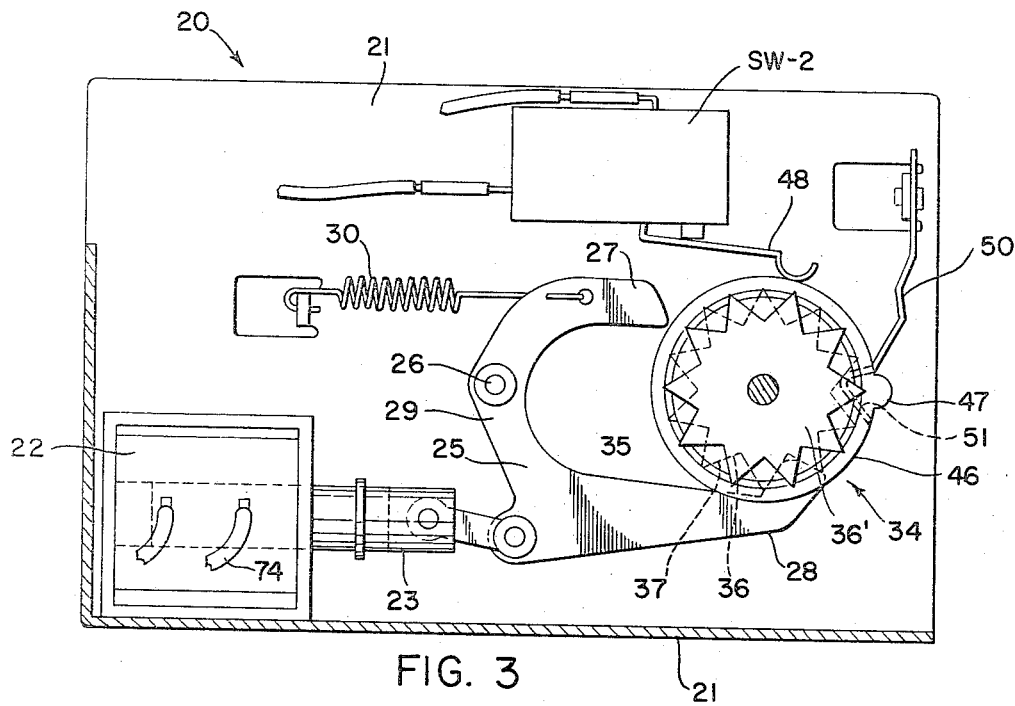

INVENTOR.
FREDERICK E. ERICKSON
BY
Meyer, Tilberry & Body
ATTORNEYS

United States Patent Office 3,313,450
Patented Apr. 11, 1967

3,313,450
VENDING MACHINE FLUID QUANTITY ACCUMULATOR AND DISPENSING TIMER
Frederick E. Erickson, Port Byron, Ill., assignor to E. W. Bliss Company, Canton, Ohio, a corporation of Delaware
Filed Feb. 8, 1966, Ser. No. 525,880
7 Claims. (Cl. 221—96)

This invention pertains to the art of automatic timers and more particularly to a vending machine timer which is conditioned by succesive orders placed with the machine to control the storage and dispensing of metered quantities of liquid corresponding to the number of orders.

A vending machine of the type to which the invention particularly pertains generaly includes a cup dispensing mechanism providing that cups will be dispensed one at a time in response to the insertion of a coin in the coin slot. The machine may include in addition, a dry ingredient storage and dispensing mechanism operated in conjunction with the cup dispensing mechanism wherein as a cup is vended by the machine, a packet of dry ingredients such as coffee, soup or the like will also be dispensed. The customer empties the dry foodstuffs into the cup and subsequently places the cup below a hot water valve. In such a machine, a hot water storage and dispensing mechanism will be included which is connected to the valve and controlled by an automatic timer responsive to a push button on the front of the machine. While the invention will be described in conjunction with such a machine, it will be appreciated that it has broader applications than the vending machine art.

In the past, automatic timers for controlling the quantity of water dispensed by a machine included a water solenoid for actuating the hot water valve, a timer motor and a cam driven by the timer motor. Through an arrangement of electrical relays controlled by the cam, the timer is conditioned to dispense water upon operation of the push button for a predetermined time so as to fill a cup to the proper level.

Often it is more convenient to obtain a number of cups in succession and then subsequently to fill the cups one at a time with hot water. However, this requires a flexibility which prior art timers have, heretofore, been unable to provide effectively. The problem involves the necessity of storing a quantity of water so that when the operator depresses the water button, he will have enough water at his disposal to fill all of the cups which have been ordered.

It is also desirable that the responsibility for seeing that each cup is properly filled is not left with the operator. That is, by accidentally over or under filling one cup, subsequent cups do not receive the proper amount of water and this is particularly likely to happen where many cups are ordered in the first instance.

In accordance with the invention, a timer includes an indexing assembly responsive to a predetermined condition such as cup delivery. A rotatable differential member is driven by the indexing assembly for progressive angular displacement in one direction so as to store the numerical equivalent of liquid dispensing timed intervals necessary to fill all the cups. A constant speed input drive is connected to the differential member for rotating it in the opposite direction in response to a control which includes a timing cam effective to interrupt the input drive at increments of rotational displacement of the differential member duplicating the duration of timed intervals stored so that each cup is filled to the proper level.

The principal object of the invention is the provision of a timer capable of storing a plurality of timed liquid dispensing intervals and subsequently dispensing a duplicate number of timed intervals each of equivalent duration.

A further object of the invention is to provide a timer particularly adapted for use with a vending machine of the type referred to wherein a liquid dispensing mechanism is controlled by the timer such that each timed interval stored corresponds with a predetermined quantity of liquid which is to be subsequently dispensed into a cup.

Another object is to provide a vending machine timer which will relieve the operator of the responsibility to see that each cup is properly filled thereby avoiding the problem of accidentally over or under filling one cup such that subsequent cups do not receive the proper amount of liquid.

These and other objects will be apparent by referring to the following description and drawings wherein:

FIGURE 3 is a sectional view of the timer unit shown in FIGURE 2 taken along line 3—3;

FIGURE 4 is a sectional view of the timer unit shown in FIGURE 2 taken along line 4—4;

Figure 1:
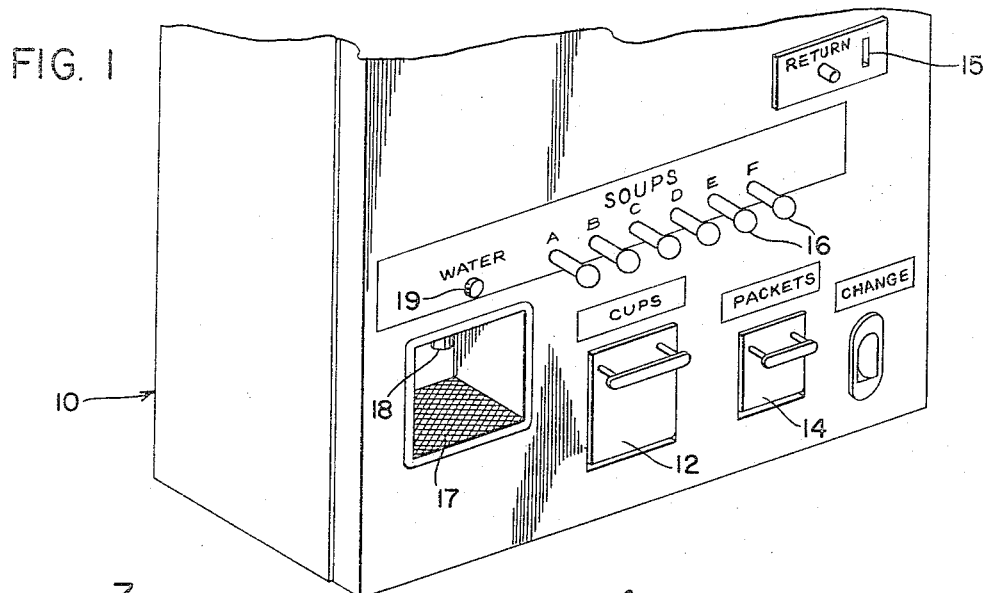
FIGURE 1 is a fragmentary perspective view of a vending machine of the type utilizing the invention.

Referring now to the drawings wherein the showings are for the purpose of illustrating a preferred embodiment of the invention only and not for the purpose of limiting same, FIGURE 1 depicts a vending machine 10 of the type which dispenses a cup into a receptacle 12 and a dry ingredient packet into a receptacle 14 in response to the deposit of the proper coinage in a coin slot 15 permitting actuation of one of the levers 16. The dry ingredient packet is opened and the contents emptied into the cup.

The cup is then positioned in a compartment 17 below a water dispensing valve 18 which adds a predetermined quantity of hot water to the cup when a push button 19 is operated. A timer unit 20 comprises a subassembly of the machine 10 and controls the dispensing of hot water from the valve 18 in response to actuation of button 19.

Timer indexing

Referring to FIGURE 3, the timer unit 20 includes a frame 21 on which is mounted a solenoid 22 having a plunger and link assembly 23. The plunger and link assembly 23 is connected to an indexing lever 25 pivotally mounted at 26 on the frame 21. The indexing lever 25 has a generally U-shaped configuration of which one leg 27 is shorter than the other leg 28 for a purpose to be described hereinafter. The pivot 26 is located approximately midway between legs 27, 28 in the base 29 which connects the two legs of the lever. A drive spring 30 is connected in the leg 27 of indexing lever 25. A differential cage assembly 34 is mounted on a differential shaft 35 so as to be positioned adjacent the open end of the U-shaped indexing lever 25 and approximately midway between the legs 27, 28 thereof.

Figure 5:
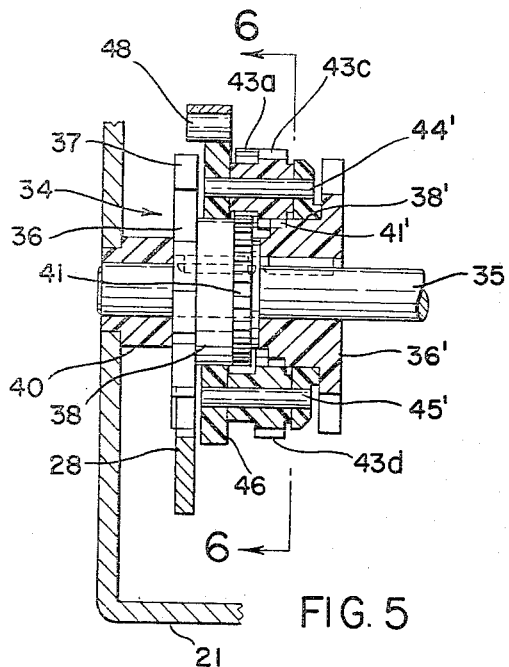
FIGURE 5 is a partial sectional view of the timer unit showing an offset cross-sectional view of the differential member taken along line 5—5 of FIGURE 6.
Figure 6:
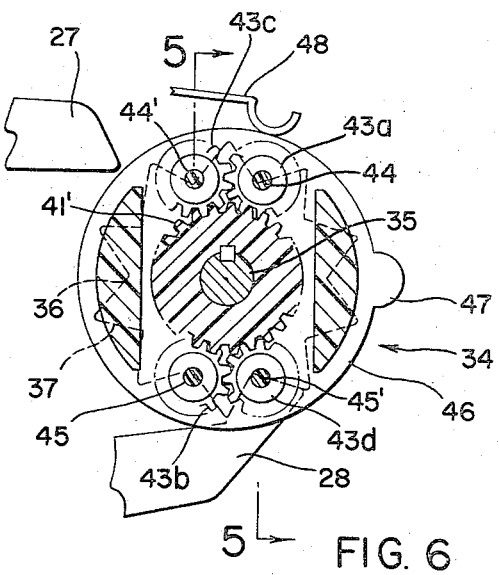
FIGURE 6 is a sectional view of the differential member taken along line 6—6 of FIGURE 5.

Referring now to FIGURES 5 and 6, the differential cage assembly 34 includes a numerical wheel lock 36 having a plurality of indexing teeth 37 extending radially from a hub 38 of reduced diameter mounted on the shaft 35 which is journaled in a bushing 40 on the frame 21. The inner end of the hub 38 has a drive gear 41 formed thereon meshing with a pair of numerical wheel pinions 43a, 43b, each of which is mounted for rotation on a shaft 44, 45 carried by a differential cage 46 having an actuator bead 47 circumferentially located thereon.

Referring again to FIGURE 3, a Micro Switch SW-2 mounted on the frame 21 has a switch arm 48 which rides on the differential cage 46 in the circumferential path of movement of actuator bead 47. A check spring 50 is mounted on the frame 21 and includes a foot portion 51 biased into engagement with the teeth 37 of the numerical wheel lock 36 which is adapted to cooperate with the legs 27, 28 of the indexing lever 25 in a manner described below.

When the solenoid 22 is energized in response to the deposit of a coin in the coin slot 15, for example, the plunger and link assembly 23 moves the indexing lever 25 in a clockwise direction as viewed in FIGURE 3 against the force of drive spring 30. The effect of this movement is to cause the numerical wheel lock 36 to rotate in a counter clockwise direction due to the fact that the short leg 27 of the indexing lever 25 pushes downwardly on one of the teeth 37 in its arcuate path of movement while simultaneously the longer leg 28 is swung free of the teeth 37. After the momentary actuation of solenoid 22, drive spring 30 returns the indexing lever 25 back to the position shown in FIGURE 3 which action is accompanied by the movement of leg 28 against one of the teeth 37 thus completing the indexing of the numerical wheel lock 36 and positively locking it against further rotation. The check spring 50 prevents clockwise rotation of wheel lock 36 when leg 28 swings free and is tensioned slightly to impart a kick to the wheel lock 36 in a counter clockwise direction to insure that leg 27 properly engages teeth 37. With each increment of rotation of the numerical wheel lock 36, the differential cage 46 is rotated a proportionate amount in a counter clockwise direction through the coaction of drive gear 41 and pinions 43a, 43b so as to move the actuator bead 47 circumferentially away from the switch arm 48 (shown in FIGURES 3 and 6 after approximately 270 degrees of rotation). The number of indexing movements of the numerical wheel lock 36 depends on the number of orders the machine 10 is required to fill, each order being registered by the deposit of a coin in the coin slot 15 or by the pull of a lever 16, for example, thus causing the momentary actuation of the solenoid 22 as explained.

Differential drive

Figure 2:
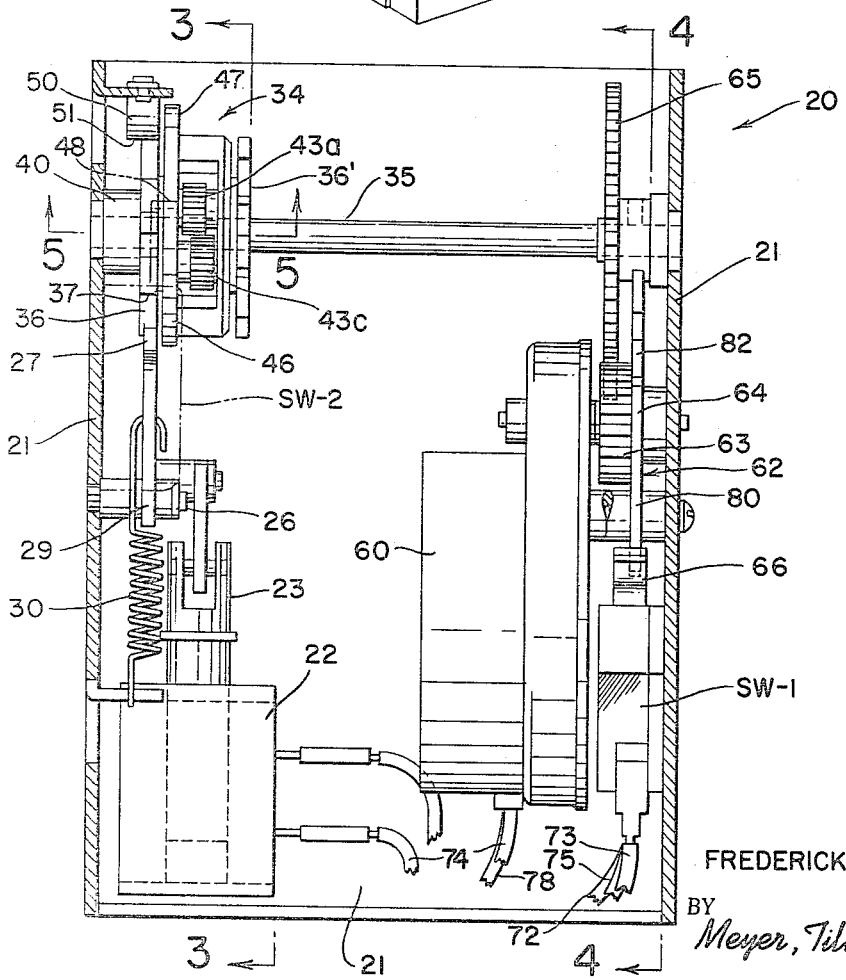
FIGURE 2 is a sectional view through the timer unit incorporated as a subassembly in the vending machine of FIGURE 1.

Directing attention to FIGURES 2 and 4, a timer motor 60 drives a cam and gear assembly 62 which includes a gear 63 and a cam 64. The gear meshes with a gear 65 mounted on the differential shaft 35 and the cam 64 engages a switch arm 66 of a Micro Switch SW-1 referred to hereinafter as the time switch.

Referring now again to FIGURES 5 and 6, on the end of the differential shaft 35 opposite the gear 65 is a differential gear 36' which for convenience of manufacture is identical in construction to the numerical wheel lock 36 and thus also includes a hub 38' having a gear 41' which drivingly engages a pair of differential pinions 43c, 43d rotatably mounted on shafts 44', 45' and each of which in turn engages one of the numerical wheel pinions 43a, 43b.

When the timer motor 60 is energized it will rotate the gear and cam assembly 62 in the direction of the arrow (FIGURE 4) at a constant speed causing the rotation of the differential cage 46 at a proportionate speed in a clockwise direction as viewed in FIGURE 6 through the drive members 63, 65, 35, 41', 43c, 43d, thus rotating the actuator bead 47 toward the switch arm 48. The arrangement is such that the numerical wheel lock 36 and differential gear 36' are each rotated through the same angle but in opposite directions in moving actuator bead 47 away from and back to the switch arm 48 as will be apparent from the following description.

Operation

Figure 7:
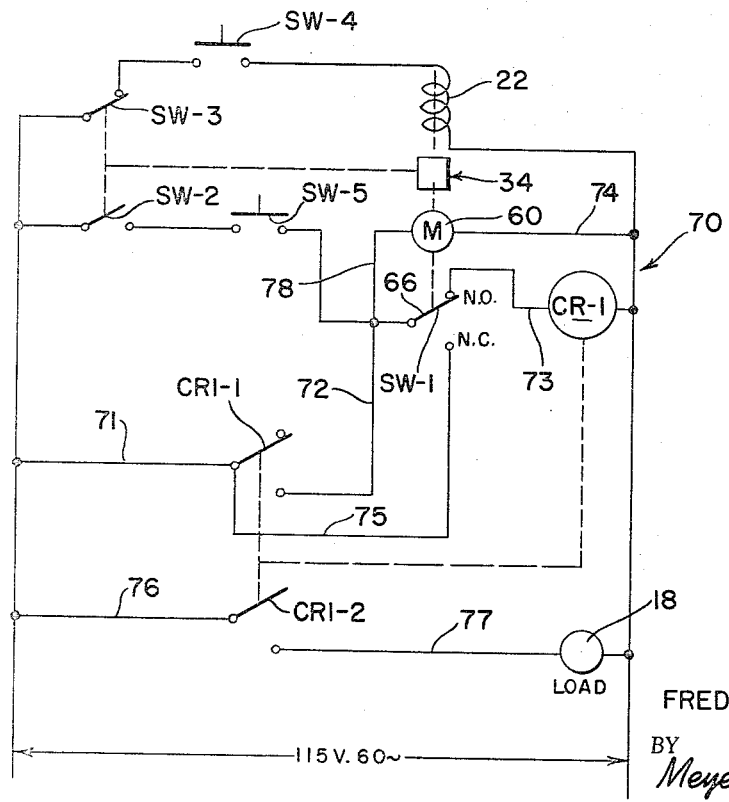
FIGURE 7 is an electrical schematic of the timer unit circuit.

Referring now to FIGURE 7, an electrical schematic of a timer circuit 70 is shown. The timer 20 and its associated circuit 70 comprise a subassembly of the machine 10 which is designed to control the opening of solenoid water valve 18 for the dispensing of a liquid such as hot water in response to depressing button 19 on the front of the machine. Since the machine 10 can dispense cups and dry ingredients at a faster rate than hot water can be dispensed, the timer 20 must be capable of storing a quantity of timed dispensing intervals for releasing water as required. Actual storage and dispensing of the water, of course, is the function of a dispensing mechanism which forms no part of the invention.

At the drop of a coin in the coin slot 15, momentary actuation of switch SW-4 occurs. This conditions the machine 10 to permit the pull of one of the levers 16 to obtain a cup and a dry ingredient packet. Closure of switch SW-4 also actuates solenoid 22 of the timer circuit 70 indexing the numerical wheel lock 36 one increment of rotation which in turn rotates the differential cage 46 of the differential cage assembly 34 one proportionate increment of rotation away from the switch arm 48 allowing the switch SW-2 to close and, in effect, storing one timed dispensing interval of water sufficient to fill one cup. With the cup placed below the water valve 18 in the receptacle 16 the water button 19 can be pressed which will actuate switch SW-5 and pull in relay CR1 and start the timer motor 60. Simultaneously CR 1-1 and CR 1-2 relay contacts close locking in relay CR1 through lines 71, 72, 73 via the time switch SW-1, the arm 66 of which is presently on the contact NO. This constitutes a "hold" circuit for the timer motor 60 through lines 71, 72, 74, 78, allowing the water push button 19 to be released. The relay contacts CR 1-2 also close and the water solenoid valve 18 (load) is energized through lines 76, 77 to dispense hot water. Timer motor 60 continues to drive through CR 1-1 contacts rotating cam 64 (FIGURE 4) and also differential drive members 35, 36', 43c, 43d which causes the differential cage 46 and the actuator bead 47 to rotate back toward the switch arm 48, in effect, dispensing the timed interval previously stored.

The switch arm 66 of time-switch SW-1 rides on cam 64 which has a plurality of equally spaced cam lobes 80 and notches 82. When the switch arm 66 reaches one of the four cam notches 82, the contacts of time-switch SW-1 will be transferred from NO to NC which causes relay CR1 to drop out. Relay contacts CR 1-1 and CR 1-2 open deenergizing the water solenoid valve 18 stopping the water flow. While relay contacts CR 1-1 are now open, the timer motor 60 continues to drive momentarily through lines 71, 75, 78, 74, via time-switch SW-1 until its switch arm 66 is transferred back to the NO position by being lifted on one of the cam lobes 80. This stops the timer motor 60 and signals the end of the timed interval originally stored. However, actuator bead 47 has been rotated to contact switch arm 48 and open switch SW-2 just before time-switch SW-1 contacts transfer back to the NO position, thus further depressing of the water push button will not pull in relay CR1 until another coin has been inserted to close switch SW-4 and cause the indexing solenoid 22 to operate as previously described.

Thus, in accordance with the invention, the rotational travel to differential cage 46 by the timer motor 60 for each timed dispensing interval equals the rotational travel of the numerical wheel lock 36 for each indexing actuation by the solenoid 22 in an opposite direction for storage of a timed interval. The indexing movement rotates the actuating bead 47 away from the switch arm 48 to allow SW-2 to close and timer motor 60 rotates the actuator bead 47 toward switch arm 48 to open SW-2. Storage of a number of timed dispensing intervals is possible since each actuation of solenoid 22 displaces the actuator bead 47 progressively farther away from the switch arm 48. A duplicate number of timed dispensing intervals is then required to return actuating bead 47 to open the contacts of switch SW-2 and render the push button 19 inoperative. So long as switch SW-2 is closed the push button 19 can be operated without depositing another coin and may be repeatedly operated until all the stored timed intervals are used up. Contacts SW-3 are optional and can be installed to open at a predetermined time and limit the number of cups which can be dispensed before liquid is added.

Having now described a preferred embodiment of the invention it will be appreciated by those skilled in the art that certain modifications may be made without departing from the invention as defined in the appended claims.

I claim:

1. A timer for storage and dispensing of time intervals comprising:

indexing means responsive to a predetermined condition for which a time interval is required, a rotatable differential member including means driven by the indexing means to progressively store the numerical equivalent of time intervals by the proportionate rotational displacement of the differential member in one direction, a constant speed drive input to the differential member for rotating it in the opposite direction to dispense time intervals, and control means for said drive input including a timing cam effective to interrupt the drive input at increments of rotational displacement of the differential member in dispensing time intervals which coincide in number and duration with the stored time intervals.

2. A timer as set forth in claim 1 wherein the differential member comprises:

a rotational cage having a switch actuator thereon which is angularly displaced in one direction in response to the storage of time intervals and in the opposite direction in response to the dispensing of time intervals, a closed switch adapted to be opened by the switch actuator when a duplicate number of time intervals stored have been dispensed, and a normally open switch in series with the other switch operable to cause the drive input to the differential member to resume after each interruption until such time as the closed switch is opened.

3. A timer as set forth in claim 2 wherein the control means comprises:

a timer motor arranged to power the drive input and to rotate said timing cam at proportional speeds, and a time switch actuated by the timing cam to shut off power to the timer motor and interrupt the input drive.

4. A timer as set forth in claim 3 wherein the timing cam actuates the time switch to shut off power to the timer motor after said closed switch has been moved to the open position by rotation of said differential member whereby said normally open switch is rendered inoperative.

5. In combination with a vending machine having cup dispensing means for vending cups one at a time and liquid dispening means for vending liquid into a cup, a timer for storage and dispensing of liquid dispensing time intervals comprising:

indexing means responsive to the vending of a cup from the machine, a rotatable differential member including means driven by the indexing means to progressively store the numerical equivalent of liquid dispensing time intervals by the proportionate rotational displacement of the differential member in one direction, a constant speed drive input to the differential member for rotatably driving it in the opposite direction to discharge liquid dispensing time intervals, and control means for said drive input including a timing cam effective to interrupt the drive input at increments of rotational displacement of the differential member which coincides with the number and duration of stored time intervals whereby the quantity of liquid necessary to properly fill a plurality of cups is first stored and subsequently dispensed in metered amounts as required.

6. In combination with a vending machine as set forth in claim 5 wherein the differential member comprises:

a rotatable cage having a switch actuator thereon which is angularly displaced in one direction when storing time intervals and in the opposite direction when dispensing them, a closed switch adapted to be opened by the switch actuator when a duplicate number of time intervals stored have been dispensed, and a manual push button accessible on the front of the vending machine controlling a normally open switch in series with the other switch effective to initiate the drive input to the differential member after each interruption thereof until such time as the closed switch is opened.

7. a vending machine as set forth in claim 6 wherein the timer comprises:

a timer motor driving the timing cam and input drive at proportionate, controlled speeds, a time switch in series with the other two switches by the timing cam to shut off power to the timer motor and thereby interrupt the drive input at intervals equivalent to the number and duration of stored time intervals wherein the arrangement is such that the timer motor is not responsive to the push button after said closed switch has been transferred to the open position by rotation of said differential member until such time as the indexing means is again operated by the vending of a cup.

References Cited by the Examiner

UNITED STATES PATENTS

| | | |
|---|---|---|
| 2,231,255 | 2/1941 | Collins. |
| 2,423,725 | 7/1947 | Poole. |
| 2,674,361 | 4/1954 | Moore _____ 194—13 |
| 2,851,189 | 9/1958 | Lux _____ 221—96 X |
| 3,133,671 | 5/1964 | Christine et al. ____ 221—96 X |
| 3,263,787 | 8/1966 | Hamburger _____ 194—3 X |

SAMUEL F. COLEMAN, *Primary Examiner.*